United States Patent
Itaya et al.

(10) Patent No.: US 11,094,345 B2
(45) Date of Patent: *Aug. 17, 2021

(54) MAGNETIC-DISK SUBSTRATE, MAGNETIC DISK, AND MAGNETIC-DISK DRIVE DEVICE

(71) Applicant: HOYA CORPORATION, Tokyo (JP)

(72) Inventors: Masanobu Itaya, Minami-Alps (JP); Kinobu Osakabe, Tokorozawa (JP)

(73) Assignee: HOYA CORPORATION, Tokyo (JP)

( * ) Notice: Subject to any disclaimer, the term of this patent is extended or adjusted under 35 U.S.C. 154(b) by 151 days.

This patent is subject to a terminal disclaimer.

(21) Appl. No.: 16/395,850

(22) Filed: Apr. 26, 2019

(65) Prior Publication Data

US 2019/0251993 A1 Aug. 15, 2019

Related U.S. Application Data

(63) Continuation of application No. 15/545,969, filed as application No. PCT/JP2016/060647 on Mar. 31, 2016, now Pat. No. 10,319,403.

(Continued)

(51) Int. Cl.
| | |
|---|---|
| *G11B 5/82* | (2006.01) |
| *G11B 5/84* | (2006.01) |
| *G11B 5/73* | (2006.01) |
| *B82Y 10/00* | (2011.01) |
| *B82Y 40/00* | (2011.01) |

(52) U.S. Cl.
CPC ............ *G11B 5/82* (2013.01); *G11B 5/73913* (2019.05); *G11B 5/73919* (2019.05); *G11B 5/73921* (2019.05); *G11B 5/84* (2013.01); *G11B 5/8404* (2013.01); *B82Y 10/00* (2013.01); *B82Y 40/00* (2013.01)

(58) Field of Classification Search
None
See application file for complete search history.

(56) References Cited

U.S. PATENT DOCUMENTS 10,319,403 B2 * 6/2019 Itaya .................. G11B 5/73921
2003/0228461 A1 12/2003 Yoshikawa et al.
(Continued)

FOREIGN PATENT DOCUMENTS

| | | |
|---|---|---|
| CN | 1661355 A | 8/2005 |
| CN | 102109535 A | 6/2011 |

(Continued)

OTHER PUBLICATIONS

International Search Report in PCT/JP2016/060647 dated Jul. 5, 2016.

(Continued)

*Primary Examiner* — Kevin M Bernatz
(74) *Attorney, Agent, or Firm* — Global IP Counselors, LLP

(57) ABSTRACT

A magnetic-disk substrate has a pair of main surfaces, and an arithmetic average roughness Ra of each of the main surfaces is 0.11 nm or less. The arithmetic average roughness Ra is a value obtained through measurement using an atomic force microscope provided with a probe having a probe tip provided with a carbon nanofiber rod-shaped member. The magnetic-disk substrate is made of glass or aluminum alloy.

20 Claims, 2 Drawing Sheets

Related U.S. Application Data

(60) Provisional application No. 62/141,121, filed on Mar. 31, 2015.

(56) References Cited

U.S. PATENT DOCUMENTS

| | | |
|---|---|---|
| 2007/0149097 A1 | 6/2007 | Fujii et al. |
| 2008/0291578 A1 | 11/2008 | Ono et al. |
| 2011/0159320 A1 | 6/2011 | Eda et al. |
| 2011/0171415 A1 | 7/2011 | Eda et al. |
| 2013/0078555 A1 | 3/2013 | Orihara et al. |
| 2013/0227749 A1 | 8/2013 | Wei et al. |
| 2016/0102420 A1 | 4/2016 | Kim et al. |
| 2016/0118073 A1 | 4/2016 | Tawara |
| 2016/0217818 A1 | 7/2016 | Tawara |
| 2018/0005659 A1 | 1/2018 | Itaya et al. |

FOREIGN PATENT DOCUMENTS

| | | |
|---|---|---|
| CN | 102656631 A | 9/2012 |
| CN | 103293341 A | 9/2013 |
| CN | 104011795 A | 8/2014 |
| JP | 2004-063062 A | 2/2004 |
| JP | 2007-168057 A | 7/2007 |
| JP | 2008-293552 A | 12/2008 |
| JP | 6499274 B2 | 4/2019 |
| WO | 2007109777 A2 | 9/2007 |
| WO | 2009128500 A1 | 10/2009 |
| WO | 2014208762 A1 | 12/2014 |
| WO | 2015046542 A1 | 4/2015 |
| WO | 2015046603 A1 | 4/2015 |
| WO | 2016171065 A1 | 10/2016 |

OTHER PUBLICATIONS

Office Action translated into Japanese in the corresponding Chinese Patent Application No. 201680019268.7, dated Dec. 26, 2018.

* cited by examiner

MAGNETIC-DISK SUBSTRATE, MAGNETIC DISK, AND MAGNETIC-DISK DRIVE DEVICE

CROSS-REFERENCE TO RELATED APPLICATIONS

This is a continuation application of U.S. patent application Ser. No. 15/545,969, filed on Jul. 24, 2017, now U.S. Pat. No. 10,319,403, which is a U.S. National stage application of International Patent Application No. PCT/JP2016/060647, filed on Mar. 31, 2016, which, in turn, claims priority under 35 U.S.C. § 119(e) to U.S. Provisional Patent Application No. 62/141,121, filed on Mar. 31, 2015, and the entire contents of U.S. patent application Ser. No. 15/545,969, International Patent Application No. PCT/JP2016/060647, and U.S. Provisional Patent Application No. 62/141,121 are hereby incorporated herein by reference.

BACKGROUND

Field of the Invention

The present invention relates to magnetic-disk substrate having a pair of main surfaces, a magnetic disk, and a method for manufacturing a magnetic-disk substrate.

Background Information

Conventionally, an aluminum alloy substrate or a glass substrate has been preferably used in a magnetic disk used as one type of information recording medium. Nowadays, in order to meet the demand for an increase in the storage capacity of hard disk drive apparatuses, attempts have been made to increase the magnetic recording density. Accompanying this, the magnetic recording information area has been made smaller by making the flying height of the magnetic head from the magnetic recording surface extremely low. For example, magnetic recording is performed by forming perpendicular magnetization in a magnetic layer of the magnetic disk. In such magnetic-disk substrate, in order to achieve a lower flying height of the magnetic head, which is necessary for a high-recording density hard disk drive apparatus, a decrease in surface unevenness of the magnetic-disk substrate is in increasing demand.

For example, there is known to be a substrate for a perpendicular magnetic recording medium, which is a substrate for a magnetic recording medium, is made of a nonmagnetic material, and has an inclination angle in a surface profile curve of 2 degrees or less, or has a surface shape in which a surface roughness Ra is 0.15 nm or less in a range from a surface roughness Ra having a cycle of 83 nm or less to a surface roughness Ra having a cycle of 30 nm or less (JP 2008-293552A). It is assumed that according to this substrate, it is possible to improve the crystal orientation of magnetic particles formed on this substrate and achieve a decrease in noise of a recording layer (or a magnetic layer) of the magnetic recording medium.

SUMMARY

The surface roughness Ra of the above-described substrate for a perpendicular magnetic recording medium is obtained based on the results of performing measurement with an atomic force microscope. The surface roughness is measured with the atomic force microscope, using a member made of single crystal Si as a probe tip, for example. However, even if the surface roughness Ra was 0.15 nm or less, magnetic-disk properties were not necessarily improved in some cases. For example, a BER (bit error rate) can be obtained as a magnetic-disk property by reading out a signal obtained after the signal is recorded in a magnetic disk. This BER did not have a sufficient correlation with the above-described surface roughness Ra, and even if the surface roughness Ra, was small, the BER was high in some cases.

In view of this, an object of the present invention is to provide an index for a surface roughness of a magnetic disk substrate that has a good correlation with the above-described magnetic-disk property, and a magnetic-disk substrate and to provide a magnetic disk that have excellent magnetic-disk properties, and a method for manufacturing a magnetic disk.

One aspect of the present invention is a magnetic-disk substrate. The magnetic-disk substrate has a pair of main surfaces, an arithmetic average roughness Ra of each of the main surfaces is 0.11 nm or less, and the arithmetic average roughness Ra is a value obtained through measurement using an atomic force microscope provided with a probe having a probe tip provided with a carbon nanofiber rod-shaped member. The magnetic-disk substrate is made of glass or aluminum alloy.

Another aspect of the present invention is also a magnetic-disk substrate. The magnetic-disk substrate has a pair of main surfaces, in surface unevenness of the main surfaces, an average area of regions occupied by a plurality of protrusions having a height of 0.1 nm or more from an average plane of the surface unevenness is 25 nm$^2$/protrusion or less, and the surface unevenness of the main surfaces is a value obtained through measurement using an atomic force microscope provided with a probe having a probe tip provided with a carbon nanofiber rod-shaped member. The magnetic-disk, substrate being made of glass or aluminum alloy.

DESCRIPTION OF EMBODIMENTS

Figure 1:
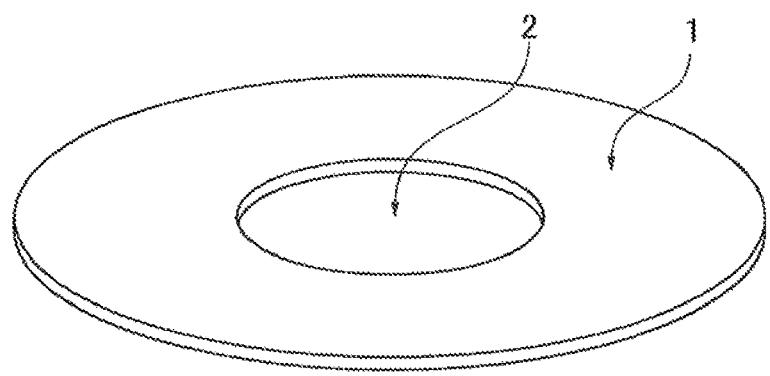
FIG. 1 is a diagram showing the external shape of a magnetic-disk substrate of this embodiment.

Hereinafter, a magnetic-disk substrate, a magnetic disk, and a method for manufacturing a magnetic-disk substrate of the present invention will be described in detail.

The inventor of this invention thought the reason why the BER and the surface roughness Ra did not have a sufficient correlation was as follows. That is, usually, the probe tip of the atomic force microscope used to measure the surface roughness Ra has a pyramidal shape or a conical shape constituted by a Si (silicon) single crystal. The inventor of the invention thought that new unevenness was formed on the surface unevenness that was to be measured originally due to this probe tip coming into contact with a surface of a magnetic-disk substrate, which is the measurement target, and this new unevenness was measured as the surface unevenness of the main surface of the magnetic-disk substrate. Thus, such information on the surface unevenness of the main surface including new unevenness formed by the probe tip does not indicate the surface unevenness that was to be measured originally.

Also, the surface of this probe tip is oxidized and a nonconductive $SiO_2$ layer is formed on the surface in some cases. In this case, when the surface unevenness of a main surface of a magnetic-disk substrate is measured by oscillating the probe tip at a constant frequency and bringing the probe tip close to or into contact with the main surface of the magnetic-disk substrate, and a glass substrate is used as the magnetic-disk substrate, static electricity tends to occur at the probe tip in particular, and static electricity tends to also occur on the glass substrate. As a result, there are cases where the surface unevenness of the glass substrate cannot be precisely measured because the movement of the probe tip is affected by the static electricity. Such a problem arises due to the degree of the surface unevenness of the glass substrate being made much smaller than conventional surface unevenness, and does not arise in the range of the surface unevenness of a conventional glass substrate. In particular, a silicon single crystal is very hard and has the same degree of hardness as the glass substrate, and thus the above-described phenomenon tends to occur. Although the influence of newly formed unevenness was not recognized on the surface roughness of the conventional glass substrate or at the recording density level, it is inferred that the main surfaces of a glass substrate have become ultra smooth and the recording density has increased dramatically, such as 750 gigabytes or more per 2.5-inch substrate, and 1000 gigabytes or more per 3.5 inch substrate, and thus the glass substrate is affected by newly formed unevenness. Therefore, the magnetic-disk substrate of the present invention is particularly preferably used in a magnetic disk having a recording density equivalent to 750 gigabytes or more per nominal 2.5-inch magnetic disk. Also, if the magnetic disk has a nominal 3.5-inch size, it is preferably used in a magnetic disk having a recording density equivalent to 1000 gigabytes or more per magnetic disk. Note that the magnetic disk substrate of the present invention can be applied to a magnetic disk having a recording density equivalent to 500 gigabytes or more per nominal 2.5-inch magnetic disk.

Also, when an excessive force is applied to the probe tip, the formation of new unevenness on the main surfaces of the magnetic-disk substrate is reduced due to deformation of the probe tip, but the probe tip has a property of returning to its original shape in the case where the probe tip deforms significantly. When the probe tip deforms significantly, a probe tip that is kept in a bent state and is unlikely to return to its original shape is not preferable as the probe tip.

By measuring the surface unevenness of a main surface of a magnetic-disk substrate using a probe having a probe tip provided with a rod-shaped member constituted by carbon nanofibers or a rod-shaped member having a Young's modulus of 100 GPa or less, the inventor of the present invention found that the measurement results and magnetic-disk properties have a high correlation and accomplished an embodiment below.

Definition

A surface roughness Ra in this specification is an arithmetic average roughness Ra in conformity with JIS 80601: 2013.

The surface unevenness of a main surface of a magnetic-disk substrate is measured using an atomic force microscope in a 1 μm×0.25 μm rectangular evaluation region with 512 points×128 points as tin measurement points. Thus, the surface roughness Ra is a value of surface unevenness in the 1 μm×0.25 μm region.

In this specification, the area of regions occupied by a plurality of protrusions having a height of x nm (x indicates a positive number such as 0.1 or 0.2) or more from an average plane of surface unevenness refers to the cross-sectional area of the protrusions of a magnetic-disk substrate that are cut when the magnetic-disk substrate is cut at a height of x nm from the average plane of the surface unevenness of the magnetic-disk substrate. Also, in other words, when an average plane calculated from data obtained by measuring, the surface unevenness of the magnetic-disk substrate is used as a reference plane and a cross section of this surface unevenness obtained using a plane at a height of x nm from the reference plane is assumed, the area refers to the area of one or more regions obtained at this cross section.

Magnetic Disk

A central portion of a disk shape, is hollowed out in a concentric shape so that the magnetic disk has a ring plate shape, and the magnetic disk rotates about this ring during magnetic recording. The magnetic disk includes a substrate and at least a magnetic layer. Note that in addition to the magnetic layer, an adherent layer, a soft magnetic layer, a nonmagnetic base layer, a perpendicular magnetic recording layer, a protecting layer, a lubricant layer, and the like are formed, for example. A glass substrate or a substrate that is provided with a plating layer and is made of an aluminum alloy is used as the substrate. A Cr alloy or the like is used in the adherent layer, for example. The adherent layer functions as a layer for affixing the glass substrate, and thus the adherent layer is not required in the case of a substrate obtained by forming an NiP plating layer on an aluminum alloy base material. A CoTaZr alloy or the like is used in the soft magnetic layer, for example. A granular nonmagnetic layer or the like is used as the nonmagnetic base layer, for example. A granular nonmagnetic layer or the like is used as the perpendicular magnetic recording layer, for example. A material made of hydrogen carbon is used in the protecting layer. A fluorine-based resin or the like is used in the lubricant layer, for example.

The magnetic disk is obtained by sequentially forming, on both main surfaces of a glass substrate, a CrTi alloy adherent layer, a CoTaZr alloy soft magnetic layer, an NiW alloy seed layer, a Ru base layer, a $CoCrPt—SiO_2.TiO_2$ alloy first, magnetic recording layer, a CoCtPtB alloy second magnetic recording layer, and a hydrogenated carbon protecting layer, using a single-substrate sputtering apparatus, for example. Furthermore, a perfluoropolyether lubricant layer is formed with a dipping method on the outermost layer of the formed layers.

Also, if the glass substrate is used for a magnetic disk for an energy-assisted magnetic recording method, it is preferable to use an FePt-based alloy or a CoPt-based alloy as the magnetic recording layer.

Aluminosilicate glass, soda-lime glass, borosilicate glass, and the like can be used as a material for the magnetic-disk glass substrate used as one example of the present embodiment. In particular, aluminosilicate glass can be suitably used in light of the fact that chemical strengthening can be carried out, and a magnetic-disk glass substrate with excellent flatness of main surfaces and substrate strength can be produced. Note, that in the above-described viewpoint, amorphous aluminosilicate glass is more preferably used.

Also, glass having the glass composition below can be used. The glass transition point of glass having the glass composition below is preferably 600° C. or more, and more preferably 650° C. or more. Glass having, a glass transition point of 600° C. or more can be suitably used in a magnetic-disk substrate for energy-assisted magnetic recording in which magnetism and heat are used in combination when magnetic recording is performed.

Glass Composition 1

The glass substrate of the present embodiments preferably amorphous aluminosilicate glass having a composition including, in mass %, $SiO_2$ in an amount of 57 to 75%, $Al_2O_3$ in an amount of 5% to 20% (note that the total amount of $SiO_2$ and $Al_2O_3$ is 74% or more), $ZrO_2$, $HfO_2$, $Nb_2O_5$, $Ta_2O_5$, $La_2O_3$, $Y_2O_3$, and $TiO_2$ in a total amount of more than 0 and 6% or less, $Li_2O$ in an amount of more than 1% and 9% or less, $Na_2O$ in an amount of 5 to 18% (note that a mass ratio $Li_2O/Na_2O$ is 0.5 or less), $K_2O$ in an amount of 0 to 6%, MgO in an amount of 0 to 4%, CaO in an amount of more than 0% and 5% or less (note that the total amount of MgO and CaO is 5% or less, and the content of CaO is greater than the content of MgO), and SrO+BaO in an amount of 0 to 3%.

Glass Composition 2

Also, the glass substrate of the present embodiment is preferably amorphous aluminosilicate glass having a composition including, in terms of oxide amount in mol %, $SiO_2$ in an amount of 50 to 75%, $Al_2O_3$ in an amount of more than 0% and 15% or less, at least one component selected from $Li_2O$, $Na_2O$, and $K_2O$ in a total amount of 5 to 35%, at least one component selected from MgO, CaO, SrO, BaO, and ZnO in a total amount of 0 to 20%, and at least one component selected from $ZrO_2$, $TiO_2$, $La_2O_3$, $Y_2O_3$, $Ta_2O_5$, $Nb_2O_5$, and $HfO_2$ in a total amount of 0 to 10%, Note that if the glass substrate having this composition is used as the glass substrate used for a magnetic disk for an energy-assisted magnetic recording method, it is sufficient to adjust the glass composition as appropriate such that the glass transition point (Tg) is 600° C. or more, for example.

If an aluminum alloy base material is used as the magnetic-disk substrate, a base material whose surface is provided with an NiP plating layer for increasing its surface hardness is used.

Magnetic-Disk Substrate

FIG. 1 is a diagram showing the showing the external shape of a magnetic-disk substrate on which the above-described magnetic layer and the like of the present embodiment are not formed. In the present embodiment, a substrate obtained by forming a NiP plating layer on a glass substrate or an aluminum alloy base material is suitably used as the magnetic-disk substrate. These substrates can be used as magnetic-disk substrates with a perpendicular magnetic recording method or an energy-assisted magnetic recording method.

As shown in FIG. 1, a magnetic-disk substrate 1 in the present embodiment is a donut-shaped thin substrate having an inner hole 2. There is no limitation on the size of the substrate. The magnetic-disk substrate 1 can be used as a substrate having a nominal 1.8 to 3.5 inch size, for example. There is also no particular limitation on its thickness, and the thickness can be 0.3 to 3 mm, for example.

The magnetic-disk substrate of the present embodiment (hereinafter also simply referred to as a substrate) has a pair of main surfaces provided on both sides, side wall surfaces extending perpendicularly to the pair of main surfaces, and chamfered surfaces that are provided between the side wall surfaces and the pair of main surfaces, extend from the side wall surfaces with an inclination with respect to the side wall surfaces, and are connected to the main surfaces. The side wall surfaces and the chamfered surfaces are not shown in FIG. 1. The side wall surfaces and the chamfered surfaces are formed at an outer circumferential side edge portion and an inner circumferential side edge portion of the substrate. Note that a portion or all of the chamfered surfaces may be formed into an arc shape in a sectional view.

Figure 2:
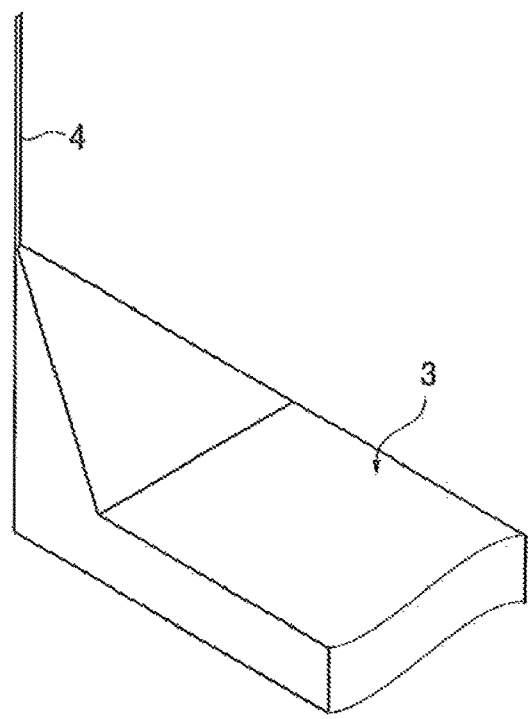
FIG. 2 is a diagram illustrating a portion of a probe including a probe tip used in an atomic force microscope used to measure a magnetic-disk substrate of this embodiment.

With regard to the main surfaces on both sides of the magnetic-disk substrate of the present embodiment, surface roughnesses Ra of the main surfaces are 0.11 nm or less. At this time, the surface roughness Ra is a value obtained through measurement using an atomic force microscope with a probe having a probe tip provided with a carbon nanofiber rod-shaped member. FIG. 2 is a diagram illustrating a portion of a probe including a probe tip that is used in the atomic force microscope.

The tip of the probe 3 shown in FIG. 2, that is, the probe tip is provided with a carbon nanofiber rod-shaped member 4. Unlike carbon nanotubes, carbon nanofibers are members whose inner portions are filled with carbon atoms. Carbon nanotubes have a six-membered ring network formed by carbon atoms, as their outer walls hollow, and their inner portions are hollow, and their perpendicular cross-sections in the longitudinal direction have an annual ring shape (concentric shape). In the present embodiment, rod-shaped carbon nanofibers are used at the probe tip. The probe 3 can be obtained by performing shape processing on a Si single crystal through etching so as to produce, as shown in FIG. 2, a cantilever having a sharp pyramidal end portion, then forming a carbon film at the sharp portion of the pyramidal shape of the cantilever, emitting an ion beam of argon to this carbon film or emitting the above-described ion beam while depositing a carbon compound thereon, and thereby forming the carbon nanofiber rod-shaped member 4 at the sharp portion of the pyramidal shape as the probe tip.

The diameter of the carbon nanofiber rod-shaped member 4 is 3 to 60 nm, and the length thereof is 5 to 1000 nm, for example.

It is preferable that the carbon nanofiber rod-shaped member 4 has an appropriate Young's modulus and easily undergoes elastic deformation, and from the viewpoint of precisely detecting unevenness of the main surfaces on both sides of the substrate, the Young's modulus is preferably 100 GPa or less, for example. In this case, the Young's modulus is more preferably 50 GPa or less, and even more preferably 30 GPa or less. In this case, although there is no particular limitation on the lower limit of the Young's modulus, the lower limit is 1 GPa, for example.

Note that a radius of curvature of the tip of the rod-shaped member 4 is preferably 1 to 30 nm in light of the fact that a highly precise surface roughness Ra can be calculated.

Parameters for surface unevenness including the surface roughness Ra of the substrate are preferably obtained using the atomic force microscope provided with the probe having such a probe tip. Specifically, when measurement is performed while the probe is moved on the main surface of the substrate, information on the position of the probe obtained by changing the position of the probe in accordance with the surface unevenness of the main surface of the substrate such that the probe oscillating at a constant frequency oscillates at a constant amplitude is acquired as measurement data. In the present embodiment, the parameters for surface unevenness including the surface roughness Ra of the main surface of the substrate are preferably obtained based on this measurement data. This measurement is referred to as Intermittent contact mode. With this measurement method, the main surface of an evaluation target substrate is scanned while being tapped with a probe that oscillates vertically at a high speed, and thus it is said that minute unevenness is easily detected on a hard surface and accurate measurement is possible. The surface roughness Ra and the average area of regions occupied by a plurality of protrusions having a height of 0.1 nm from an average plane of the surface unevenness, which are obtained as the parameters for the surface unevenness through measurement, can be used as indices for the surface unevenness of a magnetic-disk glass substrate, the indices having a high correlation with the magnetic-disk properties. In the measurement with this atomic force microscope, the probe is preferably oscillated at a spring constant of 0.1 to 80 N/m and a frequency of 30 to 400 kHz in light of the fact that the indices for the surface unevenness of the magnetic-disk substrate that has a high correlation with the magnetic-disk properties can be obtained. The above-described spring constant is more preferably 0.5 to 4 N/m. The above-described frequency is more preferably 50 to 100 kHz.

In the surface unevenness of the main surfaces of the magnetic-disk substrate that are measured in this manner, the average area of regions occupied by a plurality of protrusions having a height of 0.1 nm or more from an average plane of this surface unevenness is 25 $nm^2$/protrusion or less and preferably 20 $nm^2$/protrusion or less, in light of the fact that excellent magnetic-disk properties are exhibited. Here, the average plane is the plane that is set such that the volume of protrusions protruding from the average plane and the volume of recesses that are recessed from the average plane are equal to each other.

Figure 3:
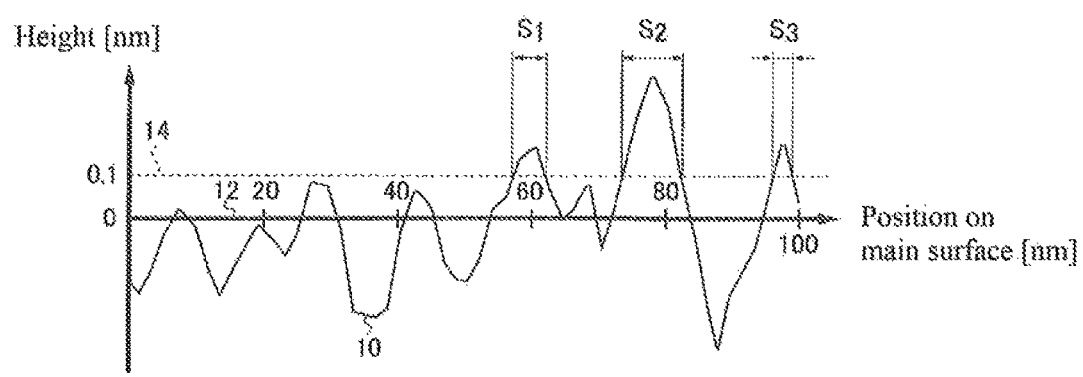
FIG. 3 is a diagram that two-dimensionally expresses one example of a contour curve element of the surface unevenness of a main surface of a magnetic-disk glass substrate.

FIG. 3 is a diagram that two-dimensionally expresses one example of a contour curve element of the surface unevenness of the main surface of the glass substrate. The horizontal axis in FIG. 3 expresses the position on the main surface in a given direction along the main surface of the glass substrate, and the vertical axis expresses the height of the surface unevenness. In the following description, two-dimensional surface unevenness will be used instead of the three-dimensional surface unevenness formed on the main surface. In FIG. 3, a straight line at a position in a height direction of 0.1 nm or more from an average line 12 of the contour curve element 10 is expressed by a level line 14. The average line 12 is a straight line indicating the level in the height direction at which the area of protrusions protruding from the average line 12 and the area of recesses that are recessed are equal to each other. At this time, there are three protrusions protruding from the level line 14, and the lengths of regions occupied by the protrusions are $S_1$, $S_2$, and $S_3$. Thus, an average line segment of a region occupied by one protrusion in the plurality of protrusions is ($S_1+S_2+S_3$). Thus, in the present embodiment, such a line segment of the region occupied by the protrusions of the two-dimensional surface unevenness is applied to the three-dimensional surface unevenness formed on the main surface of the glass substrate.

More specifically, areas having a height of 0.1 nm or more from the average plane are extracted from image data of the surface unevenness measured using the atomic force microscope, and the number of protrusions having a height of 0.1 nm or more and the area of the regions occupied by the protrusions are calculated with image analysis software, and then, the average area of the regions occupied by one protrusion is calculated by dividing the above-described area by the number. In this case, in terms of image analysis, the extracted areas having one pixel and the extracted areas having a straight line shape (having a circularity of 0) are excluded, and the number of protrusions and the area of the regions occupied by the protrusions are calculated. Accordingly, the area of the horizontal cross-sections of protrusions at a height of 0.1 nm from the average plane of the surface unevenness can be obtained as the area of regions occupied by a plurality of protrusions having a height of 0.1 nm or more from the average plane. Similarly, areas having a height of 0.2 nm or more from the average plane are extracted from the image data of the surface unevenness, and the number of protrusions having a height of 0.2 nm or more and the area of regions occupied by the protrusions are calculated with image analysis software, and then the average area of the regions occupied by one protrusion is calculated by dividing the above-described area by the number. Accordingly, the area of horizontal cross-sections of protrusions at a height of 0.2 nm from the average plane of the surface unevenness can be obtained as the area of the regions occupied by the plurality of protrusions having a height of 0.2 nm or more from the average plane.

In the present embodiment, the average area of the regions occupied by the plurality of protrusions having a height of 0.2 nm or more from the average plane of the surface unevenness of the main surface of the glass substrate is more preferably 13 $nm^2$/protrusion or less, and more preferably 10 $nm^2$/protrusion or less in light of the fact that excellent magnetic-disk properties are exhibited.

As described above, in one aspect of the above-described embodiment, setting the average area of the regions occupied by the plurality of protrusions having a height of 0.1 nm or more from the average plane of the surface unevenness of the main surface of the substrate to 25 $nm^2$/protrusion or less, or preferably 20 $nm^2$/protrusion or less corresponds to making the average area of the regions occupied by one protrusion smaller than the protrusions of a main surface of a conventional magnetic-disk substrate. As a result of this, it is possible to reduce variation in the orientation of crystals in a magnetic layer for causing perpendicular magnetization that is formed on a main surface of the substrate as the magnetic disk. Therefore, it is possible to reduce the BER which is the magnetic-disk property that has conventionally been problematic. Also, setting the average area of the regions occupied by the plurality of protrusions having a height of 0.2 nm or more from the average plane of the surface unevenness of the main surface of the substrate to 13 $nm^2$/protrusion or less, or preferably 10 $nm^2$/protrusion or less makes it possible to further reduce variation in the orientation of crystals in the magnetic layer for causing the perpendicular magnetization that is formed on the main surface of the substrate.

In the substrate of one aspect of the present embodiment, the surface roughness Ra of the main surface measured using the atomic force microscope with the probe having the probe tip provided with the carbon nanofiber rod-shaped member is 0.11 nm or less. The conventional probe tip has a polygonal pyramidal shape or a conical shape, and the carbon nanofiber rod-shaped member is not used, and thus the probe tip forms new unevenness on the main surface of the substrate during measurement, and information on the surface unevenness that was to be measured originally tends to be buried by new unevenness. Thus, it is difficult to measure actual surface unevenness. Therefore, even if a substrate had a surface roughness Ra of 0.11 nm or less measured through conventional measurement of surface unevenness, the substrate had a low BER in some cases. In the present embodiment, even if an excessive force is applied to the probe tip and the rod-shaped member undergoes elastic deformation and warps due to use of the carbon nanofiber rod-shaped member at the probe tip, the probe tip does not form new unevenness on the main surface of the substrate during measurement, and the actual surface unevenness can be measured accurately.

In particular, conventionally, there were no substrates in which the average area of the regions occupied by the plurality of protrusions having a height of 0.1 nm or more from the average plane of the surface unevenness of the main surface of the substrate was 25 $nm^2$/protrusion or less, or preferably 20 $nm^2$/protrusion or less, and the average area of the regions occupied by the above-described protrusions was greater than 25 $nm^2$/protrusion on the conventional magnetic-disk substrate.

Note that the carbon nanotubes, which have outer walls that are six-membered ring networks formed with carbon atoms, have inner portions that are cavities (hollow), and have perpendicular cross sections in the longitudinal direction that have an annual shape (concentric shape), have a regular crystalline structure with a high strength, and thus the carbon nanotubes have a high Young's modulus and are unlikely to warp, and even if an excessive force is applied thereto, the carbon nanotubes are bent and cannot return to their original form in some cases. Thus, instead of a structure with a high Young's modulus, such as carbon nanotubes, it is preferable to use solid rod-shaped carbon nanofibers that have a low Young's modulus, and tend to undergo elastic deformation. Use of a rod-shaped member having a Young's modulus of 100 GPa or less at the probe tip makes it possible to prevent the probe tip from forming new unevenness on a main surface of a glass substrate during measurement and to accurately measure the actual surface unevenness.

Figure 4:
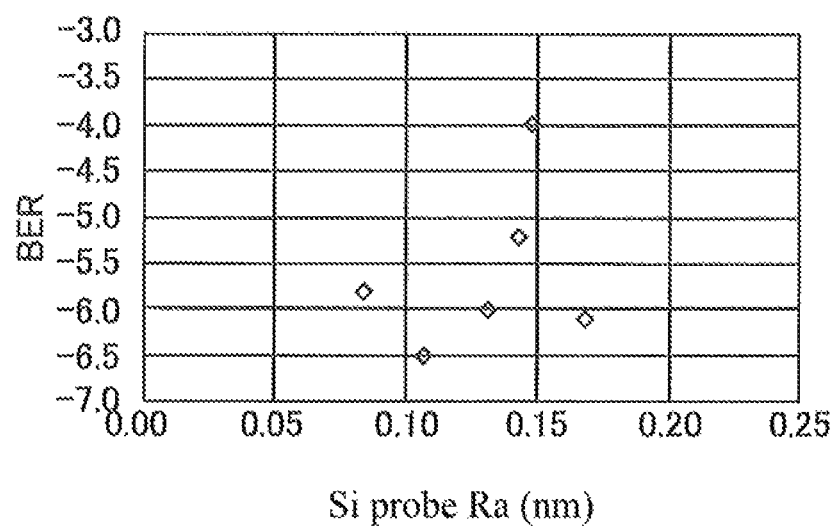
FIG. 4 is a diagram showing that a surface roughness Ra measured with an atomic force microscope in which a conventional probe is used and the BER has a low correlation.

FIG. 4 is a diagram showing that a bit error rate (hereinafter abbreviated as BER) and a surface roughness Ra (Si probe Ra) measured with a conventional atomic force microscope in which a Si probe having a probe tip constituted by Si is used have a low correlation. The vertical axis in FIG. 4 indicates x in the case where the BER is expressed as $10^x$. If the BER is $10^{-5.0}$, for example, −5.0 is indicated in the vertical axis in FIG. 4. As shown in FIG. 4, the surface roughness Ra and the BER, which is one of the magnetic-disk properties, have a low correlation.

Figure 5:
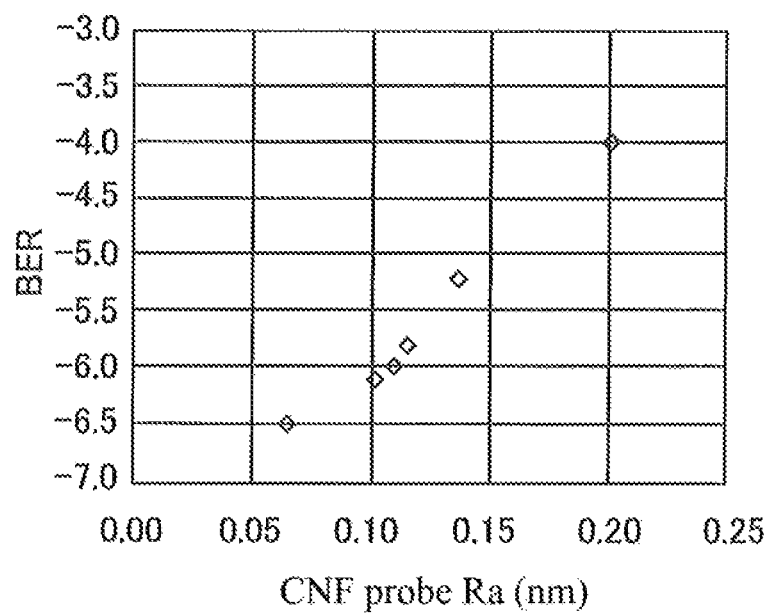
FIG. 5 is a diagram showing that a surface roughness Ra measured with an atomic force microscope in which a probe of this embodiment is used and the BER has a high correlation.

In contrast, in the present embodiment, since the rod-shaped member made of carbon nanofibers (CNFs) is used as the probe tip, as shown in FIG. 5, the surface roughness Ra (CNF probe Ra) and the BER, which is one of the magnetic-disk properties, has a high correlation. FIG. 5 is a diagram showing that the BER and the surface roughness Ra (CNF probe Ra) measured with the atomic force microscope in which the probe having the probe tip provided with a CNF rod-shaped member is used have a high correlation. Similarly to FIG. 4, the vertical axis in FIG. 5 indicates x in the case where the BER is expressed as $10^x$. For example, if the BER is $10^{-5.0}$, −5.0 is indicated. In the surface unevenness of main surfaces of the substrate used in the examples shown in FIGS. 4 and 5, the average area of regions occupied by a plurality of protrusions having a height of 0.1 nm or more from the average plane of the surface unevenness is approximately constant.

In this manner, the present embodiment can provide indices for surface roughnesses of main surfaces of a magnetic-disk glass substrate, the indices having a high correlation with the BER, which is the magnetic-disk property, and can provide a magnetic-disk glass substrate having a low BER.

Also, if a Si member is used at a probe tip as in the conventional probe, a $SiO_2$ oxide film having a low electric conductivity is formed on the surface of the tip, and static electricity tends to remain at the probe tip. During measurement of the surface roughness Ra, remaining static electricity tends to have an adverse influence on the operation of the probe. If the surface roughness Ra is measured using an atomic force microscope with a probe having a probe tip provided with a conductive rod-shaped member, one end of the rod-shaped member is preferably connected to earth. In this case, even if static electricity that has an adverse influence on the probe operation occurs due to friction between the main surface of the glass substrate and the probe tip, the static electricity can be smoothly released via earth, and thus does not easily affect the measurement. Thus, an accurate surface roughness Ra can be measured.

Such a magnetic-disk glass substrate can be realized with a method for manufacturing a magnetic-disk glass substrate that will be described below.

Furthermore, in the magnetic-disk substrate of the present embodiment, a difference between the average area of the regions occupied by the plurality of protrusions having a height of 0.1 nm or more from the average plane of the surface unevenness and the average area of the regions occupied by the plurality of protrusions having a height of 0.2 nm or more from the average plane of the surface unevenness is preferably 13 $nm^2$/protrusion or less in order to keep a good BER. Although the reason for this is not necessarily clear, it is inferred that the shape of protrusions on the surface of the substrate easily coincide with each other by setting the above-described difference to 13 $nm^2$/protrusion or less, and variation in size of magnetic particles can be suppressed when the substrate is formed into a magnetic disk. It is inferred that if there is significant variation in the shape of protrusions on the surface of the substrate, many magnetic particles will grow abnormally, and as a result, noise will increase at the time of recording reproduction and the BER will deteriorate. The surface unevenness of the main surfaces of the above-described magnetic-disk substrate is a value measured using the atomic force microscope provided with the probe having the probe tip provided with the carbon nanofiber rod-shaped member. At this time, the area occupied by the plurality of protrusions having a height of 0.1 nm or more from the average plane of the surface unevenness of the magnetic-disk substrate is preferably 20% or less, and more preferably 18% or less with respect to the area of the measurement range (1 μm×0.25 μm). Furthermore, the number of the protrusions having a height of 0.1 nm or more from the average plane of the surface unevenness of the magnetic-disk substrate is preferably 500 or more, and preferably in a range of 600 or more and 800 or less in the above-described measurement range 1 μm×0.25 μm. The number of protrusions having a height of 0.2 nm or more from the average plane of the surface unevenness is preferably 300 or less, and more preferably in a range of 150 or more and 450 or less in the above-described measurement range 1 μm×0.25 μm. With the magnetic-disk substrate with limited surface unevenness, the above-described surface roughness Ra is preferably 0.11 nm or less, but may be greater than 0.11 nm, and the upper limit of the surface roughness Ra is preferably 0.15 nm.

Also, as described above, with the magnetic-disk substrate having a surface roughness Ra of 0.11 nm or less, the average area of the regions occupied by the plurality of protrusions having a height of 0.1 nm or more from the average plane of the surface unevenness is preferably 25 nm$^2$/protrusion or less, but may be greater than 25 nm$^2$/protrusion, and the upper limit of the average is preferably 30 nm$^2$/protrusion.

Method for Manufacturing Magnetic-Disk Glass Substrate

Next, a method for manufacturing a magnetic-disk glass substrate of the present embodiment will be described. First, a glass blank that serves as the blank for a plate-shaped magnetic-disk glass substrate having a pair of main surfaces is produced. For example, the glass blank is produced through press molding processing. Note that although the glass blank is produced through press molding in the present embodiment, a glass plate may be formed with a known float method, redraw method, or fusion method and a glass blank having the same shape as the above-described glass blank may be cut out from the formed glass plate. Next, a circular inner hole is formed in a center portion of the produced glass blank so as to produce a ring-shaped (annular) glass substrate (circular hole formation processing). Next, shape processing is performed on the glass substrate provided with the inner hole (shape processing). Accordingly, the glass substrate can be obtained. Next, edge surface polishing is performed on the glass substrate (edge surface polishing processing). Grinding with fixed abrasive particles is performed on the main surfaces of the glass substrate that was subjected to edge surface polishing (grinding processing). Next, polishing is performed on the main surfaces of the glass substrate (polishing processing). Polishing is performed a plurality of times in the polishing processing. Chemical strengthening may be performed as needed on the glass substrate during the plurality of times of polishing (chemical strengthening processing). Thereafter, ultrasonic cleaning is performed on the glass substrate that has undergone the polishing processing. A magnetic-disk glass substrate can be obtained through the above-described processes. Hereinafter, the respective processes will be described in detail.

(a) Press Molding Processing

A glass blank is molded by cutting molten glass flow with a cutter, sandwiching the mass of the cut molten glass between press molding surfaces of a pair of metal molds, and pressing the mass. After pressing is performed for a predetermined amount of time, the metal molds are opened to remove the glass blank.

(b) Circular Hole Formation Processing

A disk-shaped glass substrate provided with a circular hole is obtained by forming a circular inner hole in the glass blank using a drill or the like.

(c) Shape Processing

In the shape processing, chamfering processing is performed on edge surfaces of the glass substrate that has undergone the circular hole formation processing. Chamfering processing is performed using a grinding grindstone or the like. On the edge surfaces of the glass substrate, side wall surfaces of the substrate that extend perpendicularly to the main surfaces of the glass substrate and edge surfaces that are provided between these side wall surfaces and the main surfaces and extend with an inclination with respect to the side wall surfaces are formed through chamfering processing.

(d) Edge Surface Polishing Processing

In the edge surface polishing processing, mirror finishing is performed on an inner circumferential side edge surface and an outer circumferential side edge surface of the glass substrate through edge surface polishing processing using a polishing liquid containing polishing abrasive parades.

(e) Grinding Processing

In the grinding processing, grinding is performed on the main surfaces of the glass substrate using a double-side grinding apparatus provided with a planetary gear mechanism. Specifically, the main surfaces on both sides of the glass substrate are ground while the outer circumferential side edge surface of the glass substrate is held in a holding hole provided in a holding member of the double-side grinding apparatus. The double-side grinding apparatus has a pair of upper and lower surface plates (an upper surface plate and a lower surface plate), and the glass substrate is sandwiched between the upper surface plate and the lower surface plate. Moreover, the glass substrate and the surface plates are moved relative to each other by moving one or both of the upper surface plate and the lower surface plate, and thereby both main surfaces of the glass substrate can be ground.

(f) Polishing Processing

Next, polishing is performed on the ground main surfaces of the glass substrate. Specifically, the main surfaces on both sides of the glass substrate are polished while the outer circumferential side edge surface of the glass substrate is held in a holding hole provided in a carrier for polishing of the double-side grinding apparatus. Polishing is performed using a double-side polishing apparatus. In the double side polishing apparatus, the glass substrate is held between the pair of upper and lower surface plates. Tabular polishing pads (resin polisher, for example) having an annular shape overall are attached to the upper surface of the lower surface plate and the bottom surface of the upper surface plate. The glass substrate and the surface plates are moved relative to each other by moving one or both of the upper surface plate and the lower surface plate, and thereby both main surfaces of the glass substrate are polished.

Polishing is preferably performed three times; first to third polishing, in light of the fact that the surface roughnesses Ra of the main surfaces of the glass substrate of the present embodiment are 0.11 Ra or less or the average area of the regions occupied by the plurality of protrusions having a height of 0.1 nm from the average plane of the surface unevenness is 25 nm$^2$/protrusion or less.

First polishing is performed in order to remove blemishes and warping and adjust, minute surface unevenness (micro-waviness, roughness) remaining on the main surfaces that have undergone the grinding processing, and in order to mirror-polish the main surfaces. Cerium oxide abrasive particles, zirconia abrasive particles, or the like, for example, are used, and are supplied between the polishing pads of the double-side polishing apparatus and the main surfaces of the glass substrate, and thus the main surfaces of the glass substrate are polished. The polishing abrasive particles used in first polishing are cerium oxide particles having an average particle diameter d50 of 0.1 to 1.5 μm, for example.

Second polishing is performed for mirror-polishing for further smoothing the main surfaces of the glass substrate. In second polishing, a polishing liquid containing colloidal silica having an average particle diameter d50 of 5 to 20 nm as loose abrasive particles is supplied between the polishing pads of the double side polishing apparatus and the main surfaces of the glass substrate, and the main surfaces of the glass substrate, are polished. The pH of the polishing liquid is preferably acidic and more preferably 1 to 4 from the viewpoint of a polishing rate and a reduction in foreign matter remaining on the surfaces that have undergone polishing. It is preferable that the polishing machining allowance is 1 to 5 µm in terms of the substrate thickness (the total amount of machining allowance for both main surfaces).

In third polishing, the degree of smoothness of the main surfaces of the glass substrate is further increased. In third polishing, a polishing liquid containing colloidal silica having an average particle diameter d50 of 30 to 100 nm as loose abrasive particles is supplied between the polishing pads of the double-side polishing apparatus and the main surfaces of the glass substrate, and the main surfaces of the glass substrate are polished. The pH of the polishing liquid is preferably alkaline and more preferably 11 to 13 from the viewpoint of smoothness. It is preferable that the machining allowance is 0.05 to 1 µm in terms of the substrate thickness.

Also, it is preferable that an acidic polishing liquid is used in second polishing, and an alkaline polishing liquid is used in third polishing. It is preferable to perform polishing using, the alkaline polishing liquid after polishing using an acidic liquid in light of the fact that the alkaline polishing liquid has a slower polishing speed compared to the acidic polishing liquid and can realize highly precise polishing.

Also, as described above, it is preferable that the average particle diameter d50 of colloidal silica in third polishing is larger than in second polishing. The average particle diameter d50 of colloidal silica in third polishing is more preferably two times or more and even more preferably three times or more the average particle diameter d50 in second polishing. Doing so makes it possible to sufficiently remove, with silica abrasive particles having relatively large particle diameters, minute and sharp single-cuts formed on the surfaces of the substrate by silica abrasive particles having small particle diameters, and to form the surfaces of a magnetic-disk substrate of the present embodiment. It is conceivable that if the shape such as so-called burr, which is minute and sharp, remains on the surface of the substrate, the substrate is likely to break when measurement is performed with a probe having a high hardness, such as a single crystal Si probe.

Also, the machining allowance in third polishing is preferably smaller compared to that in second polishing. It is preferable that the polishing time of third polishing is ⅓ or less, and ¼ or less the polishing time of second polishing, for example, in light of the fact that the above-described surface roughness Ra is 0.11 nm or less, or the average area of the regions occupied by the plurality of protrusions having a height of 0.1 nm or more from the average plane of the surface unevenness is 25 nm$^2$/protrusion or less.

Note that the machining allowance for the glass substrate in first to third polishing is 30 µm or less, preferably 25 µm or less, and more preferably 20 µm.

In this manner, when two-step polishing with colloidal silica is performed in the final stage of polishing processes, the pH of the polishing liquid, the particle diameter of colloidal silica, and the machining allowance are combined so as to be respectively in the above-described ranges, and thereby a magnetic-disk glass substrate that is suitable for the present invention can be obtained.

Accordingly, the surface roughnesses Ra of the main surfaces obtained when being measured using the atomic force microscope with the probe having the probe tip provided with the carbon nanofiber rod-shaped member can be set to 0.11 nm or less. Also, as described above, the average area of the regions occupied by the plurality of protrusions having a height of 0.1 nm or more from the average plane of surface unevenness of the magnetic-disk substrate can be set to 25 cm$^2$/protrusion or less by adjusting the type and particle diameter of polishing abrasive particles and the pH of the polishing liquid and setting the machining allowance for the glass substrate in polishing to 30 µm or less. That is, the pair of main surfaces of the substrate are polished with a machining allowance of 30 µm or less such that the above-described average is 25 nm$^2$/protrusion or less.

(g) Chemical Strengthening Processing

If the glass substrate is chemically strengthened, a melt obtained by mixing potassium nitrate and sodium sulfate or the like, for example, is used as a chemical strengthening liquid, and the glass substrate is immersed in the chemical strengthening liquid. The chemical strengthening processing is performed between first polishing and second polishing, for example. Note that the chemical strengthening processing is nut essential, and need not be performed.

In this manner, a magnetic-disk glass substrate is produced.

Method for manufacturing a magnetic-disk aluminum alloy substrate.

Next, a method for manufacturing a magnetic-disk aluminum alloy substrate of the present embodiment will be described simply.

(a) Production of Grind Substrate

An aluminum alloy is melted, cast, rolled, and cut into a disk-shaped aluminum magnesium alloy (aluminum alloy) blink, and then cutting processing is performed on inner and outer edge surfaces, and grinding is performed on the surfaces so as to produce an annular grind substrate (base material).

(b) Plating Layer Formation

Next, an aluminum alloy substrate is obtained by performing NiP plating on the surfaces of the grind substrate (base material). The aluminum alloy is light in Weight and has excellent process ability, but its surface hardness does not sufficiently meet the requirements for a magnetic disk, and thus in order to prevent impairment of the substrate, an NiP plating layer is formed on the surfaces of the grind substrate. The thickness of the NiP plating layer is around a dozen µm, for example. Furthermore, in order to reduce inner stress of the NiP plating layer, annealing is performed.

(c) Polishing

Polishing for removing waviness and microwaviness and smoothing the grind substrate is performed on the grind substrate provided with the plating layer. In polishing, the NiP plating layer is polished in a plurality of, stages, using polishing pads (for example, resin polishers) and a polishing slurry obtained by dispersing loose abrasive particles containing alumina abrasive particles.

The substrate polished in this manner is cleaned so as to obtain a magnetic disk substrate.

In this polishing as well, similarly to polishing in the above-described method for manufacturing a glass substrate, the surface roughnesses Ra of the main surfaces can be set to 0.11 nm or less by performing a plurality of stages of polishing. Also, the pair of main surfaces of the substrate can be polished with a machining allowance of 30 µm or less such that the average area of the regions occupied by the plurality of protrusions having a height of 0.1 nm or more from the average plane of the surface unevenness is 25 nm$^2$/protrusion or less.

Note that the condition that the average area of the regions occupied by the plurality of protrusions having a height of 0.1 nm or more from the average plane of the above-described surface unevenness is 25 nm$^2$/protrusion or less can be applied to a step of determining whether or not magnetic-disk properties of a substrate are in the allowable ranges as a magnetic-disk substrate, in the method for manufacturing a magnetic-disk substrate.

For example, the surface roughnesses of the main surfaces of the substrate are measured using an atomic force microscope with a probe having a probe tip provided with a carbon nanofiber rod-shaped member, for example, a rod-shaped member having an Young's modulus of 100 GPa or less, and the average area of regions occupied by a plurality of protrusions having a height of 0.1 nm or more from the average plane of the surface unevenness of the main surfaces of the substrate is obtained based on data of the surface unevenness obtained through measurement. It is determined whether or not the obtained average area is 25 nm$^2$/protrusion or less, and if it is determined that the above-described average area is 25 nm$^2$/protrusion or less, the measured substrate is adopted as a magnetic-disk substrate. In this case, the average value used in the above-described determination is preferably 20 nm$^2$/protrusion or less. Furthermore, the condition that the average area of regions occupied by a plurality of protrusions having a height of 0.2 nm or more from the average plane of the surface unevenness of the main surfaces is 12 nm$^2$/protrusion or less is preferably used in the above-described determination.

Such a method is performed with an atomic force microscope and an arithmetic apparatus that obtains the above-described average area based on the data of surface unevenness obtained with the atomic force microscope.

In this case as well, the condition that, the surface roughness Ra that can be obtained based on the data of surface unevenness obtained through the above-described measurement is 0.11 nm or less may be included in the conditions of the above-described determination.

Of course, the above-described screening method can be applied to the magnetic-disk glass substrate and the magnetic-disk aluminum alloy substrate.

The magnetic-disk properties of the magnetic disk produced using such a magnetic-disk substrate are increased, and for example, the BER can be set to $10^{-5.8}$ or less.

Experimental Example 1

In order to check the effects of the present embodiment, 18 glass substrates of six types were produced by changing the conditions of second polishing and third polishing, using the above-described method for manufacturing a glass substrate. Three substrates per type were produced. Glass for the glass substrates had the above-described glass composition.

The surface unevenness of each of the six types of glass substrates were measured with an atomic force microscope using a probe having a probe tip provided with a carbon nanofiber rod-shaped member having a diameter of 20 nm and a length of 200 nm. Measurement was performed under the following conditions.

Measurement area: 1 μm×0.25 μm rectangular region
Measurement points: 512 points×128 points (512 points for 1 μm and 128 points for 0.25 μm)
Measurement mode: Intermittent contact mode
Frequency: 70 KHz
Spring constant of probe: 4 N/m Furthermore, the surface unevenness of one of the six types of glass substrates was measured with an atomic force microscope using a pyramidal probe having a probe tip constituted by Si. Measurement was per under the above-described conditions.

Furthermore, as described above, a magnetic-disk substrate was produced by providing a magnetic layer and the like on the one remaining glass substrate in the various produced glass substrates, the magnetic-disk substrate was integrated into a HDD (hard disk drive apparatus) together with a magnetic head provided with a DFH (disk flying height) mechanism, and the BER value of the produced magnetic disk was obtained under the condition that a protruding amount of the DFH element portion was used as a reference, the protruding amount being obtained when the tip of the DFH element portion came into contact with the surface of the substrate by making the DFH element portion gradually protrude, and the protruding amount was reduced by 1 nm, that is, under the condition that the back-off amount was 1 nm. Note that the linear recording density during signal recording was 93 kbit/mm.

Table 1 below shows the results of evaluation of the six types of glass substrates. The six types of glass substrates in Table 1 are expressed, as Samples 1 to 6. The field "Surface roughness Ra (CNF probe Ra)" shows the results measured using carbon nanofibers at the probe tip, and the field "Surface roughness Ra (Si probe Ra)" shows the results measured using a pyramidal Si at the probe tip. Numerical values x in the field "BER" in Table 1 express the x in $10^x$.

TABLE 1

| | Surface roughness Ra (Si probe Ra) | Surface roughness Ra (CNF probe Ra) | BER |
|---|---|---|---|
| Sample 1 | 0.107 | 0.065 | −6.5 |
| Sample 2 | 0.168 | 0.102 | −6.1 |
| Sample 3 | 0.131 | 0.110 | −6.0 |
| Sample 4 | 0.085 | 0.115 | −5.8 |
| Sample 5 | 0.143 | 0.137 | −5.2 |
| Sample 6 | 0.148 | 0.201 | −4.0 |

The results shown in Table 1 above are also the results shown in FIGS. 4 and 5.

In this manner, as is understood from Table 1 and FIGS. 4 and 5, the surface roughness Ra (CNF probe Ra) has a high correlation with the BER, compared with the surface roughness Ra (Si probe Ra). Furthermore, it is understood from Table 1 that the BER can be set to $10^{-5.8}$ or less and preferably $10^{-6.0}$ or less, which are in the allowable range for magnetic properties, by setting the surface roughness Ra (CNF probe Ra) to 0.11 nm or less. At that time, the average area of the regions occupied by the plurality of protrusions having a height of 0.1 nm or more from the average plane of surface unevenness of the glass substrates of Samples 1 to 6 were 30 nm$^2$/protrusion or less.

Experimental Example 2

Furthermore, in order to check the effects of the present embodiment, eight, glass substrates of four types were produced using the above-described method for manufacturing a glass substrate by changing the conditions of second polishing and third polishing. Glass for the glass substrates had the above-described glass composition.

The surface unevenness of each of the four types of glass substrates were measured with an atomic force microscope using a probe having a probe tip provided with a carbon nanofiber rod-shaped member having a diameter of 20 nm and a length of 200 nm. Measurement conditions were the same as those in Experimental Example 1.

Furthermore, a magnetic-disk substrate was produced by providing a magnetic layer and the like on the one remaining glass substrate in the various produced glass substrates, the magnetic-disk substrate was integrated into a HDD (hard disk drive apparatus) together with a magnetic head provided with a DFH (disk flying height) mechanism, and the BER value of the magnetic disk was obtained under the same conditions as those in Experimental Example 1.

Table 2 below shows the results of evaluation of the four types of glass substrates. In Table 2, the field "0.1 nm or more" indicates the average area of regions occupied by a plurality of protrusions having a height of 0.1 nm or more from the average plane of the surface unevenness, and the field "0.2 nm or more" indicates the average area of regions occupied by a plurality of protrusions having a height of 0.2 nm or more from the average plane of surface unevenness. Numerical values x in the field "BER" in Table 2 express the x in

TABLE 2

|  | 0.1 nm or more | 0.2 nm or more | BER |
| --- | --- | --- | --- |
| Sample 7 | 20 nm²/protrusion | 10 nm²/protrusion | −6.0 |
| Sample 8 | 24 nm²/protrusion | 12 nm²/protrusion | −5.8 |
| Sample 9 | 28 nm²/protrusion | 14 nm²/protrusion | −5.5 |
| Sample 10 | 33 nm²/protrusion | 17 nm²/protrusion | −5.0 |

The surface roughnesses Ra of the glass substrates of Samples 7 to 10 were 0.15 nm or less.

It is understood from Table 2 that Samples 7 and 8 in which the average area of the regions occupied by the plurality of protrusions having a height of 0.1 nm from the average plane of the surface unevenness was 25 nm²/protrusion or less had a BER of $10^{-5.8}$ or less and the magnetic-disk properties were increased.

Although a magnetic-disk glass substrate, a method for manufacturing a magnetic-disk substrate, and a determination method for a magnetic-disk substrate of the present invention were described in detail above, the present invention is not limited to the above-described embodiment, and it will be appreciated that various improvements and modifications can be made without departing from the gist of the present invention.

According to one aspect of the embodiment, the magnetic-disk substrate has a pair of main surfaces, arithmetic average roughnesses Ra of the main surfaces are each 0.11 nm or less, and the surface roughness Ra is a value obtained through measurement using an atomic force microscope provided with a probe having a probe tip provided with a carbon nanofiber rod-shaped member.

According to another aspect of the embodiment, the magnetic-disk substrate has a pair of main surfaces, in surface unevenness of the main surfaces, an average area of regions occupied by a plurality of protrusions having a height of 0.1 nm or more from an average plane of the surface unevenness is 25 nm²/protrusion or less, and the surface unevenness of the main surfaces is a value obtained through measurement using an atomic force microscope provided with a probe having a probe tip provided with a carbon nanofiber rod-shaped member.

It is preferable that the average area of the regions occupied by the plurality of protrusions having a height of 0.1 nm or more from the average plane of the surface unevenness is 20 nm²/protrusion or less.

It is preferable that a difference between the average area of the regions occupied by the plurality of protrusions having a height of 0.1 nm or more from the average plane of the surface unevenness and an average area of regions occupied by a plurality of protrusions having a height of 0.2 nm or more from the average plane of the surface unevenness is 13 nm²/protrusion or less.

It is preferable that the carbon nanofiber rod-shaped member provided at the probe tip has a Young's modulus of 100 GPa or less.

It is preferable that the rod-shaped member is electrically conductive, and one end of the rod-shaped member is connected to earth.

It is preferable that the surface roughness Ra or the surface unevenness is obtained based on information on a position of the probe that is obtained by changing the position of the probe in accordance with the surface unevenness of the main surfaces such that the probe oscillates at a constant amplitude.

It is preferable that in the measurement performed using the atomic force microscope, the probe is oscillated at a spring constant of 0.1 to 80 N/m and a frequency of 30 to 400 KHz.

It is preferable that the substrate is a magnetic-disk substrate for energy-assisted magnetic recording.

According to another aspect of the embodiment, is a magnetic disk in which at least a magnetic film is formed on a surface of the magnetic-disk substrate.

Yet another aspect of the embodiment is a method for manufacturing a magnetic-disk substrate. In this manufacturing method, after grinding processing, in a polishing processing step, a pair of main surfaces of the substrate are polished with a machining allowance of 30 μm or less such that an average area of regions occupied by a plurality of protrusions having a height of 0.1 nm or more from an average plane of surface unevenness of the main surfaces is 25 nm²/protrusion or less, the surface unevenness having been measured using an atomic force microscope provided with a probe having a probe tip provided With a carbon nanofiber rod-shaped member.

It is preferable that the polishing processing step includes: performing first polishing on the pair of main surfaces of the magnetic-disk substrate using an acidic polishing liquid; performing second polishing on the main surfaces of the magnetic-disk substrate using an alkaline polishing liquid after the first polishing; and shortening a polishing time in the second polishing, compared to that in the first polishing.

It is preferable that in the surface unevenness of the main surfaces, the average area of the regions occupied by the plurality of protrusions having a height of 0.1 nm or more from the average plane of the surface unevenness is 20 nm²/protrusion or less.

It is preferable that in the surface unevenness of the main surfaces, an average area of regions occupied by a plurality of protrusions having a height of 0.2 nm or more from the average plane of the surface unevenness is 12 nm²/protrusion or less.

Furthermore, still another aspect of the embodiment is a method for manufacturing a magnetic-disk substrate including a step of determining surface unevenness of main surfaces of a magnetic-disk substrate and determining whether or not the magnetic-disk substrate is acceptable as a magnetic-disk substrate. In the determination step, the surface unevenness of the main surfaces of the magnetic-disk substrate is measured using an atomic force microscope provided with a probe having a probe tip provided with a carbon nanofiber rod-shaped member, and based on data of the surface unevenness obtained through measurement, in the surface unevenness of the main surfaces, an average area of regions occupied by a plurality of protrusions having a height of 0.1 nm or more from an average plane of the surface unevenness is obtained, and if the average area is 25 nm²/protrusion or less, a determination that the measured substrate is to be adopted as a magnetic-disk substrate is made.

The condition that the average area of the regions occupied by the plurality of protrusions having a height of 0.1 nm or more from the average, plane of the surface unevenness of the main surfaces is 20 nm$^2$/protrusion or less is preferably used in the determination.

The condition that an average area of regions occupied by a plurality of protrusions having a height of 0.2 nm or more from the average plane of the surface unevenness of the main surfaces is 12 nm$^2$/protrusion or less is preferably included in the determination.

According to the above-described magnetic-disk substrate, magnetic disk, and method for manufacturing a magnetic-disk substrate, it is possible to provide a magnetic-disk substrate that have excellent magnetic-disk properties.

What is claimed is:

1. A magnetic-disk substrate, comprising:
a pair of main surfaces,
an arithmetic average roughness Ra of each of the main surfaces being 0.11 nm or less,
the arithmetic average roughness Ra being a value obtained through measurement using an atomic force microscope provided with a probe having a probe tip provided with a carbon nanofiber rod-shaped member, and
the magnetic-disk substrate being made of glass or aluminum alloy.

2. The magnetic-disk substrate according to claim 1,
wherein in surface unevenness of the main surfaces, an average area of regions occupied by a plurality of protrusions having a height of 0.1 nm or more from an average plane of the surface unevenness is 25 nm$^2$/protrusion or less.

3. The magnetic-disk substrate according to claim 1,
wherein in surface unevenness of the main surfaces, an average area of regions occupied by a plurality of protrusions having a height of 0.1 nm or more from an average plane of the surface unevenness is 20 nm$^2$/protrusion or less.

4. The magnetic-disk substrate according to claim 1,
wherein in surface unevenness of the main surfaces, an average area of regions occupied by a plurality of protrusions having a height of 0.2 nm or more from an average plane of the surface unevenness is 12 nm$^2$/protrusion or less.

5. The magnetic-disk substrate according to claim 1,
wherein a difference between an average area of regions occupied by a plurality of protrusions having a height of 0.1 nm or more from an average plane of surface unevenness of the main surfaces and an average area of regions occupied by a plurality of protrusions having a height of 0.2 nm or more from the average plane of the surface unevenness is 13 nm$^2$/protrusion or less.

6. The magnetic-disk substrate according to claim 1,
wherein the magnetic-disk substrate is a magnetic-disk glass substrate made of glass.

7. The magnetic-disk substrate according to claim 6,
wherein a glass transition point of glass of the magnetic-disk glass substrate is 600° C. or more.

8. The magnetic-disk substrate according to claim 1,
wherein the magnetic-disk substrate is a substrate for a magnetic disk having a nominal 2.5-inch size and a recording density of 750 gigabytes or more per magnetic disk, or for a magnetic disk having a nominal 3.5-inch size and a recording density of 1000 gigabytes or more per magnetic disk.

9. The magnetic-disk substrate according to claim 1,
wherein the magnetic-disk substrate is a substrate for a magnetic disk that has a nominal 3.5-inch size.

10. The magnetic-disk substrate according to claim 1,
wherein the magnetic-disk substrate is a substrate for energy-assisted magnetic recording.

11. A magnetic disk,
wherein a magnetic film is formed on the magnetic-disk substrate according to claim 1.

12. A magnetic-disk drive device comprising:
the magnetic disk according to claim 11.

13. A magnetic-disk substrate, comprising:
a pair of main surfaces,
in surface unevenness of the main surfaces, an average area of regions occupied by a plurality of protrusions having a height of 0.1 nm or more from an average plane of the surface unevenness being 25 nm$^2$/protrusion or less,
the surface unevenness of the main surfaces being a value obtained through measurement using an atomic force microscope provided with a probe having a probe tip provided with a carbon nanofiber rod-shaped member, and
the magnetic-disk substrate being made of glass or aluminum alloy.

14. The magnetic-disk substrate according to claim 13,
wherein an arithmetic average roughness Ra of each of the main surfaces is 0.15 nm or less.

15. The magnetic-disk substrate according to claim 13,
wherein in the surface unevenness of the main surfaces, the average area of the regions occupied by the plurality of protrusions having a height of 0.1 nm or more from the average plane of the surface unevenness is 20 nm$^2$/protrusion or less.

16. The magnetic-disk substrate according to claim 13,
wherein in the surface unevenness of the main surfaces, the average area of regions occupied by the plurality of protrusions having a height of 0.2 nm or more from the average plane of the surface unevenness is 12 nm$^2$/protrusion or less.

17. The magnetic-disk substrate according to claim 13,
wherein a difference between the average area of the regions occupied by the plurality of protrusions having a height of 0.1 nm or more from the average plane of the surface unevenness and an average area of regions occupied by a plurality of protrusions having a height of 0.2 nm or more from the average plane of the surface unevenness is 13 nm$^2$/protrusion or less.

18. The magnetic-disk substrate according to claim 13,
wherein the magnetic-disk substrate is a magnetic-disk glass substrate made of glass, and a glass transition point of glass of the magnetic-disk glass substrate is 600° C. or more.

19. A magnetic disk,
wherein a magnetic film is formed on the magnetic-disk substrate according to claim 13.

20. A magnetic-disk drive device comprising:
the magnetic disk according to claim 19.

* * * * *